Patented May 19, 1931

1,805,911

UNITED STATES PATENT OFFICE

WINFRID HENTRICH, OF WIESDORF-ON-THE-RHINE, RUDOLF KNOCHE, OF LEVER-KUSEN-ON-THE-RHINE, AND PAUL VIRCK, OF DESSAU-ANHALT, GERMANY, ASSIGNORS TO GENERAL ANILINE WORKS, INC., OF NEW YORK, N. Y., A CORPORATION OF DELAWARE

MONO-AZO DYE

No Drawing. Application filed December 20, 1927, Serial No. 241,448, and in Germany December 23, 1926.

The present invention relates to the new azo dyestuffs of the general formula:

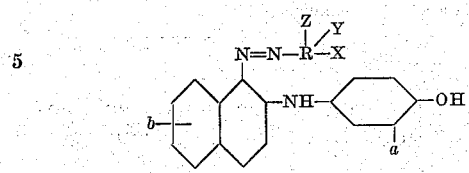

wherein R represents a benzene or naphthalene nucleus, X a nitro group standing in para-position to the azo group, Y represents $SO_3H$ or $-CH_2.SO_3H$, Z represents hydrogen, alkoxy or a sulfonic acid group, b represents hydrogen or a sulfonic acid group and a represents hydrogen or a carboxylic acid group.

The new dyestuffs are obtainable by diazotizing a compound of the general formula:

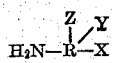

wherein R represents a benzene or naphthalene nucleus, X a nitro group standing in para-position to the amino group, Y represents $SO_3H$ or $-CH_2.SO_3H$ and Z hydrogen, alkoxy or a sulfonic acid group and coupling the diazo compound thus obtained with a compound of the general formula:

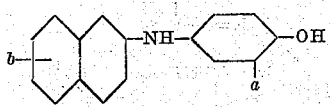

wherein b represents hydrogen or a sulfonic acid group and a represents hydrogen or a carboxylic acid group. The new dyestuffs are very stable in spite of the free hydroxyl group contained in their nucleus. They dye wool violet to blue to black shades. In so far as the new dyestuffs only contain one sulfonic group which is moreover present in the diazo component, they dye acetate silk in clear fast shades.

Upon treatment with stannous chloride and hydrochloric acid an aromatic para diamine and 1-amine-2-(4'-hydroxyphenyl) aminonaphthalene are formed.

The following examples will illustrate our invention:—

*Example 1.*—The diazo compound obtained from 235 parts by weight of the ammonium salt of 4-nitro-1-aminobenzene-2-sulfonic acid is filtered off, suspended in glacial acetic acid and added in the cold to a solution of 235 parts by weight of 4'-hydroxyphenyl-2-aminonaphthalene in glacial acetic acid; the coupling is completed by the addition of sodium acetate. The resulting dyestuff having in its free state the following formula:

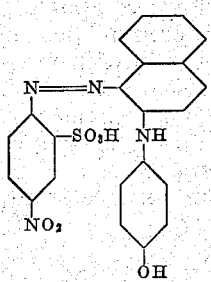

is filtered, pressed and dried. It dyes wool in very powerful bluish black even shades, possessing very good fastness properties in regard to light, fulling, boiling with acid and steam pressing. Acetate silk is dyed in violet blue shades.

In the above example, the 4'-hydroxyphenyl-2-aminonaphthalene can be replaced by 4'hydroxyphenyl-2-aminonaphthalene-3'-carboxylic acid.

*Example 2.*—342 parts by weight of the disodium salt of 4-nitraniline-2.5-disulfonic acid are diazotized in the customary manner, the solution of the diazo compound is then poured into a solution of 233 parts by weight of 4'-hydroxyphenyl-2-aminonaphthalene in glacial acetic acid in the cold. The coupling is completed by the addition of sodium acetate; the resulting dyestuff having in its free state the following formula:

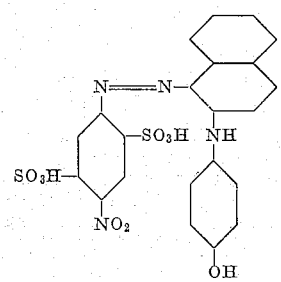

is filtered and dried. It dyes wool in very powerful even bluish black shades of good fastness to light and fulling.

Instead of 4-nitraniline-2.5-disulfonic acid 2-methoxy-4-nitraniline-6-sulfonic acid can be employed.

If the 4-nitraniline-2.5-disulfonic acid in the above example is replaced by 249 parts by weight of the ammonium salt of 5-nitro-2-aminobenzyl-ω-sulfonic acid, a dyestuff is obtained, which dyes wool very powerful violet black shades of good fastness to light and fulling.

*Example 3.*—290 parts by weight of the sodium salt of 4-nitro-1-aminonaphthalene-5-sulfonic acid are dissolved in water, a solution of 69 parts by weight of sodium nitrite in water is added thereto, and the whole is acidified with hydrochloric acid, stirring the while. The diazo compound, which is precipitated, is filtered off, suspended in glacial acetic acid and added in the cold to a solution of 235 parts by weight of 4'-hydroxyphenyl-2-aminonaphthalene in glacial acetic acid. The coupling is completed by the addition of sodium acetate. The resulting dyestuff having in its free state the following formula:

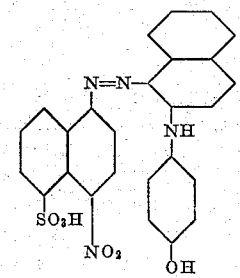

is filtered and dried. It dyes wool very powerful even violet black shades of good fastness to light, fulling and steam pressing.

In this example, the 4-nitro-1-aminonaphthalene-5-sulfonic acid can be replaced, among others, by 4-nitro-1-aminonaphthalene-6-sulfonic acid.

In the following table several dyestuffs are set out together with their respective shades on wool:—

| Dyestuff from | | Shade on wool |
|---|---|---|
| 4 - nitraniline - 2 - sulfonic acid. | 4'-hydroxyphenyl - 2 - aminonaphthalene. | blue-black |
| 4 - nitraniline - 2 - sulfonic acid | 4'-hydroxyphenyl - 2 - aminonaphthalene-3'-carboxylic acid | marine-blue |
| 4 - nitraniline - 2 - sulfonic acid | 4'-hydroxyphenyl - 2 - aminonaphthalene-7-sulfonic acid | reddish blue |
| 4 - nitraniline - 2 - sulfonic acid | 4'-hydroxyphenyl - 2 - aminonaphthalene-3'-sulfonic acid | bluish violet |
| 2-methoxy-4-nitraniline-6-sulfonic acid | 4'-hydroxyphenyl - 2 - aminonaphthalene | violet |
| 5-nitro-2-aminobenzyl-ω-sulfonic acid | 4'-hydroxyphenyl - 2 - aminonaphthalene | violet |
| 5-nitro-2-aminobenzyl-ω-sulfonic acid | 4'-hydroxyphenyl - 2 - aminonaphthalene-3'-carboxylic acid | violet |
| 5-nitro-2-aminobenzyl-ω-sulfonic acid | 4'-hydroxyphenyl - 2 - aminonaphthalene-7-sulfonic acid | violet |
| 4 - nitraniline - 2.5 - disulfonic acid | 4'-hydroxyphenyl - 2 - aminonaphthalene | blue-black |
| 4-nitro-1-aminonaphthalene-5-sulfonic acid | 4'-hydroxyphenyl - 2 - aminonaphthalene | violet black |
| 4-nitro-1-aminonaphthalene-6-sulfonic acid | 4'-hydroxyphenyl - 2 - aminonaphthalene | blue-black |

We claim:—

1. As a new product the mono azo dyestuff having in its free form the formula:

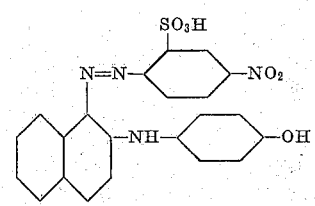

being a dark powder, soluble in water and dyeing wool very powerful violet black shades of good fastness to light, fulling and steam pressing, and yielding upon treatment with stannous chloride and hydrochloric acid 1.4-phenylene-diamine sulfonic acid and 1-amino-2-(4'-hydroxy-phenyl)-amino-naphthalene.

2. As new products the mono-azo-dyestuffs of the general formula:

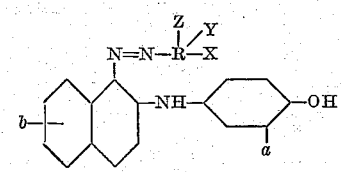

wherein R represents a benzene or naphthalene nucleus, X a nitro group standing in para-position to the azo group, Y represents $SO_3H$ or $-CH_2 \cdot SO_3H$, Z represents hydrogen, alkoxy or a sulfonic acid group, $b$ represents hydrogen or a sulfonic acid group and $a$ represents hydrogen or a carboxylic acid group.

3. As new products the mono-azo-dyestuffs of the general formula:
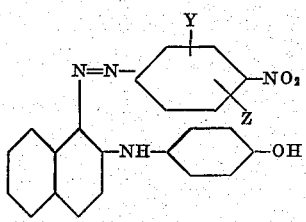
wherein Y represents $SO_3H$ or $-CH_2SO_3H$ and Z represents hydrogen, alkoxy or a sulfonic acid group.
In testimony whereof we have hereunto set our hands.
WINFRID HENTRICH.
RUDOLF KNOCHE.
PAUL VIRCK.